United States Patent
Sibbach et al.

(10) Patent No.: US 12,241,424 B2
(45) Date of Patent: Mar. 4, 2025

(54) HYDROGEN FUEL LEAK DETECTION SYSTEM

(71) Applicant: General Electric Company, Schenectady, NY (US)

(72) Inventors: Arthur W. Sibbach, Boxford, MA (US); Paul Burchell Glaser, Alpharetta, GA (US); Michael A. Benjamin, Cincinnati, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 236 days.

(21) Appl. No.: 17/209,724

(22) Filed: Mar. 23, 2021

(65) Prior Publication Data

US 2022/0307428 A1 Sep. 29, 2022

(51) Int. Cl.
*F02C 9/46* (2006.01)
*B64D 37/32* (2006.01)
(Continued)

(52) U.S. Cl.
CPC ............... *F02C 9/46* (2013.01); *B64D 37/32* (2013.01); *F01D 21/003* (2013.01); *F01D 21/12* (2013.01);
(Continued)

(58) Field of Classification Search
None
See application file for complete search history.

(56) References Cited

U.S. PATENT DOCUMENTS

| 4,062,184 A | * | 12/1977 | Hagen | ........................ F02C 3/22 |
| | | | | 60/39.282 |
| 5,117,951 A | * | 6/1992 | Sisson | .................... A45C 13/03 |
| | | | | 206/293 |

(Continued)

FOREIGN PATENT DOCUMENTS

| JP | 2015103215 A | * | 11/2013 | ............. G08B 17/00 |
| JP | 2014025741 A | | 2/2014 | |

OTHER PUBLICATIONS

Shawal "Gas Leakage Detection Using Thermal Imaging Technique" (Year: 2014).*

(Continued)

*Primary Examiner* — Ehud Gartenberg
*Assistant Examiner* — William L Breazeal
(74) *Attorney, Agent, or Firm* — Venable LLP; David D. Leege; Michele V. Frank

(57) ABSTRACT

A fuel leak detection system for hydrogen fuel system including a monitored component. The fuel leak detection system including a sensor and controller communicatively coupled to the sensor. The sensor is positioned to monitor at least a portion of the monitored component. The sensor is configured (i) to sense a parameter corresponding to a hydrogen fuel leak of the monitored component and (ii) to generate an output. The controller is configured (i) to receive the output of the sensor, (ii) to determine, based on the output of the sensor, if a leak has occurred in the monitored component, and (iii) to generate an output indicating a fuel system leak when the controller determines that the leak has occurred in the monitored component. The monitored component may be a component of one of a fuel tank, a power generator, and a fuel delivery assembly.

19 Claims, 5 Drawing Sheets

(51) Int. Cl.
*F01D 21/00* (2006.01)
*F01D 21/12* (2006.01)
*F02C 7/22* (2006.01)

(52) U.S. Cl.
CPC .......... *F02C 7/22* (2013.01); *F05D 2220/323* (2013.01); *F05D 2260/605* (2013.01); *F05D 2260/80* (2013.01); *F05D 2260/84* (2013.01); *F05D 2270/094* (2013.01); *F05D 2270/303* (2013.01); *F05D 2270/8041* (2013.01)

(56) References Cited

U.S. PATENT DOCUMENTS

| | | | | |
|---|---|---|---|---|
| 5,291,869 | A * | 3/1994 | Bennett | F02M 21/0287 123/41.31 |
| 6,984,465 | B2 | 1/2006 | Canepa et al. | |
| 8,319,833 | B2 | 11/2012 | Weinstein et al. | |
| 9,239,008 | B2 | 1/2016 | Ekanayake et al. | |
| 9,683,910 | B2 | 6/2017 | Ekanayake et al. | |
| 10,386,259 | B2 | 8/2019 | Zhang et al. | |
| 10,473,031 | B2 | 11/2019 | Ellsworth et al. | |
| 2005/0126264 | A1 * | 6/2005 | Komninos | G01M 3/24 73/40.5 A |
| 2006/0051520 | A1 * | 3/2006 | Behle | H01J 37/32972 118/723 R |
| 2006/0220888 | A1 * | 10/2006 | Germouni | G08B 21/14 165/11.1 |
| 2006/0257094 | A1 | 11/2006 | McEvoy et al. | |
| 2009/0189786 | A1 * | 7/2009 | Fabas | G01C 23/00 340/963 |
| 2010/0095745 | A1 * | 4/2010 | Flynn | G01M 3/207 73/40.7 |
| 2011/0181879 | A1 * | 7/2011 | Chen | G01N 21/274 356/318 |
| 2012/0304662 | A1 * | 12/2012 | Prociw | F01D 25/14 60/782 |
| 2016/0377502 | A1 * | 12/2016 | Xu | G01M 3/002 73/40.7 |
| 2017/0016797 | A1 * | 1/2017 | Park | G01N 29/4472 |
| 2020/0348662 | A1 | 11/2020 | Cella et al. | |
| 2021/0214093 | A1 * | 7/2021 | Bruno | B64D 37/04 |
| 2022/0131165 | A1 * | 4/2022 | Ballantine | B01D 53/02 |

OTHER PUBLICATIONS

Lukonge "Leak Detection System for Long-Distance Onshore and Offshore Gas Pipeline Using Acoustic Emission Technology" (Year: 2020).*

Bjorn Fehrm, "Bjorn's Corner: The challenges of hydrogen. Part 29. Gas turbine heat management," Leeham News and Analysis, Mar. 19, 2021, accessed online at <leehamnews.com/2021/03/19/bjorns-corner-the-challenges-of-hydrogen-part-29-gas-turbine-heat-management/>.

* cited by examiner

HYDROGEN FUEL LEAK DETECTION SYSTEM

TECHNICAL FIELD

Preferred embodiments described herein relate to leak detection systems.

BACKGROUND

The propulsion system for commercial aircraft typically includes one or more aircraft engines, such as turbofan jet engines. The turbofan jet engine(s) may be mounted to a respective one of the wings of the aircraft, such as in a suspended position beneath the wing using a pylon. These engines may be powered by aviation turbine fuel, which is typically a combustible hydrocarbon liquid fuel, such as a kerosene-type fuel, having a desired carbon number. The aviation turbine fuel is a relatively power-dense fuel that is relatively easy to transport and stays in a liquid phase through most ambient operating conditions for aircraft. Such fuel produces carbon dioxide upon combustion, and improvements to reduce such carbon dioxide emissions in commercial aircraft are desired.

BRIEF SUMMARY

According to an embodiment, a hydrogen fuel system comprising: a fuel tank for holding a hydrogen fuel; a power generator configured to generate power; a fuel delivery assembly extending from the fuel tank to the power generator, the fuel delivery assembly being configured to provide the hydrogen fuel from the fuel tank to the power generator in at least one of a gaseous phase and a supercritical phase; a monitored component, the monitored component being a component of one of the fuel tank, the power generator, and the fuel delivery assembly; and a fuel leak detection system including: (a) a sensor positioned to monitor at least a portion of the monitored component, the sensor being configured (i) to sense a parameter corresponding to a hydrogen fuel leak of the monitored component, and (ii) to generate an output; and (b) a controller communicatively coupled to the sensor, the controller configured (i) to receive the output of the sensor, (ii) to determine, based on the output of the sensor, if a leak has occurred in the monitored component, and (iii) to generate an output indicating a fuel system leak when the controller determines that the leak has occurred in the monitored component.

Additional features, advantages, and embodiments of the present disclosure are set forth or apparent from consideration of the following detailed description, drawings and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 5A shows a fuel tank of the fuel system, and FIG. 5B shows a pipe of a fuel delivery assembly of the fuel system.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

To reduce carbon dioxide emissions from commercial aircraft, a hydrogen fuel may be used. Hydrogen fuel, however, poses a number of challenges as compared to combustible hydrocarbon liquid fuel. For example, hydrogen fuel has a relatively low boiling point, and, in its gaseous form, hydrogen fuel has a much lower power density. Hydrogen fuel, when in a gaseous form, also tends to seep through materials and attachment points between components without leaving residue. Moreover, hydrogen fuel is colorless and odorless. When hydrogen fuel burns, it has a flame that is not visible to the naked eye under normal lighting conditions.

The present disclosure discusses ways to improve the safety of hydrogen fuel systems and, particularly, such fuel systems used in aircraft. Preferred embodiments described herein relate to leak detection systems for use in hydrogen fuel systems, including, for example, hydrogen fuel systems for aircraft. Current aircraft using combustible hydrocarbon liquid fuel typically do not include systems for detecting fuel leaks. Hydrogen fuel, however, poses a number of challenges as compared to combustible hydrocarbon liquid fuel. When in a gaseous form, hydrogen fuel tends to seep through materials and attachment points between components without leaving residue. Moreover, hydrogen fuel is colorless and odorless. When hydrogen fuel burns, it has a flame that is not visible to the naked eye under normal lighting conditions. To improve the safety of aircraft using hydrogen fuel, the present disclosure provides a leak detection system that can be used onboard an aircraft to monitor for hydrogen fuel leaks.

Figure 1:
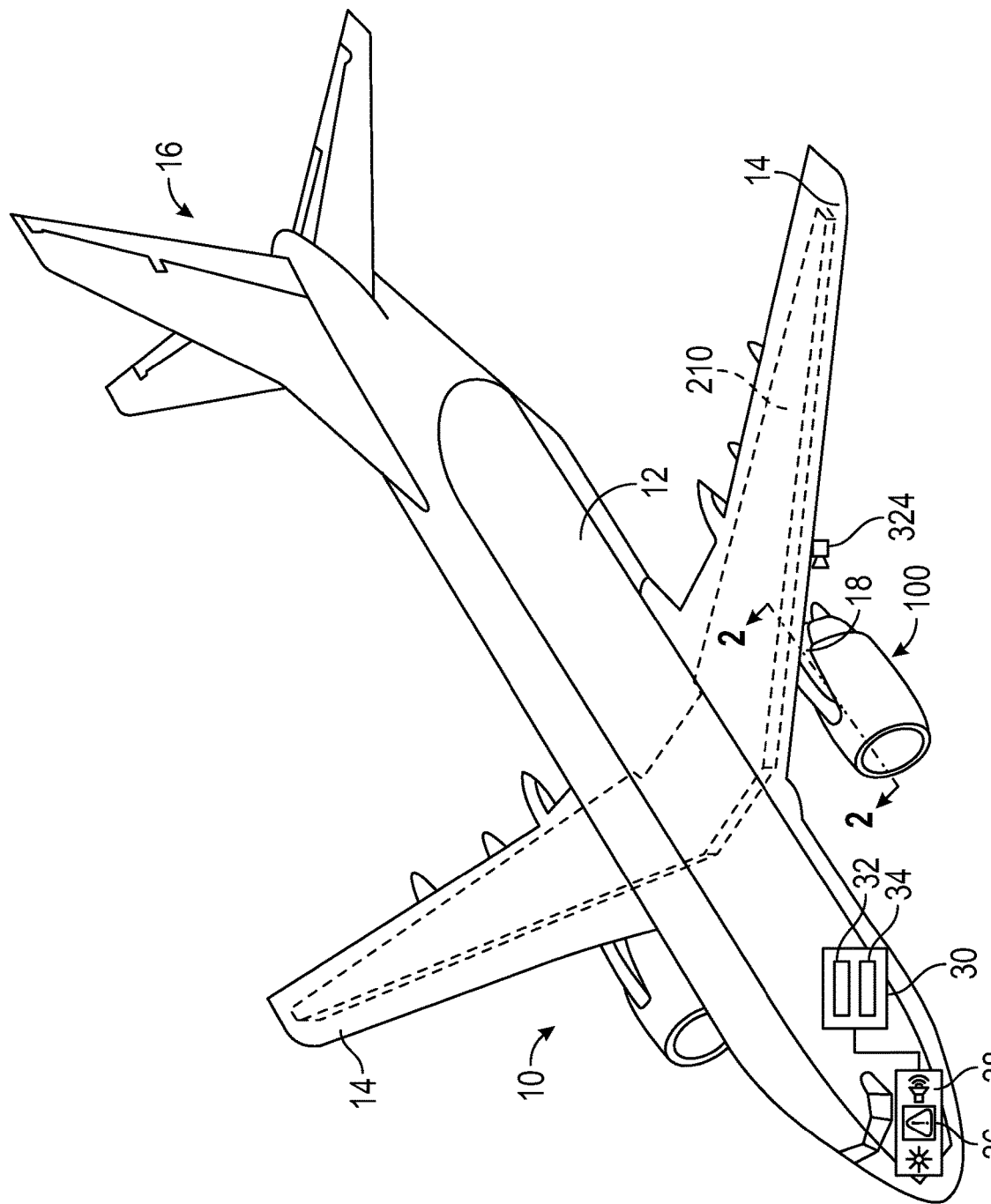
FIG. 1 is a schematic perspective view of an aircraft having a fuel system according to an embodiment of the present disclosure.

FIG. 1 is a perspective view of an aircraft 10 that may implement various preferred embodiments. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16, and the fuselage 12.

As will be described further below with reference to FIG. 2, the engines 100 shown in FIG. 1 are gas turbine engines that are each capable of selectively generating a propulsive thrust for the aircraft 10. The amount of propulsive thrust may be controlled at least in part based on a volume of fuel provided to the gas turbine engines 100 via a fuel system 200 (see FIG. 3). In the embodiments discussed herein, the fuel is a hydrogen fuel that is stored in a fuel tank 210 of the fuel system 200. As shown in FIG. 1, at least a portion of the fuel tank 210 is located in each wing 14 and a portion of the fuel tank 210 is located in the fuselage 12 between the wings 14. The fuel tank 210, however, may be located at other suitable locations in the fuselage 12 or the wing 14. The fuel tank 210 may also be located entirely within the fuselage 12 or the wing 14. The fuel tank 210 may also be separate tanks instead of a single, unitary body, such as, for example, two tanks each located within a corresponding wing 14.

For the embodiment depicted, the power generator is an engine 100 and, in particular, a high bypass turbofan engine. The engine 100 may also be referred to as a turbofan engine 100 herein. FIG. 2 is a schematic, cross-sectional view of one of the engines 100 used in the propulsion system for the aircraft 10 shown in FIG. 1. The turbofan engine 100 has an axial direction A (extending parallel to a longitudinal centerline 101, shown for reference in FIG. 2), a radial direction R, and a circumferential direction. The circumferential direction (not depicted in FIG. 2) extends in a direction rotating about the axial direction A. The turbofan engine 100 includes a fan section 102 and a turbomachine 104 disposed downstream from the fan section 102.

Figure 2:
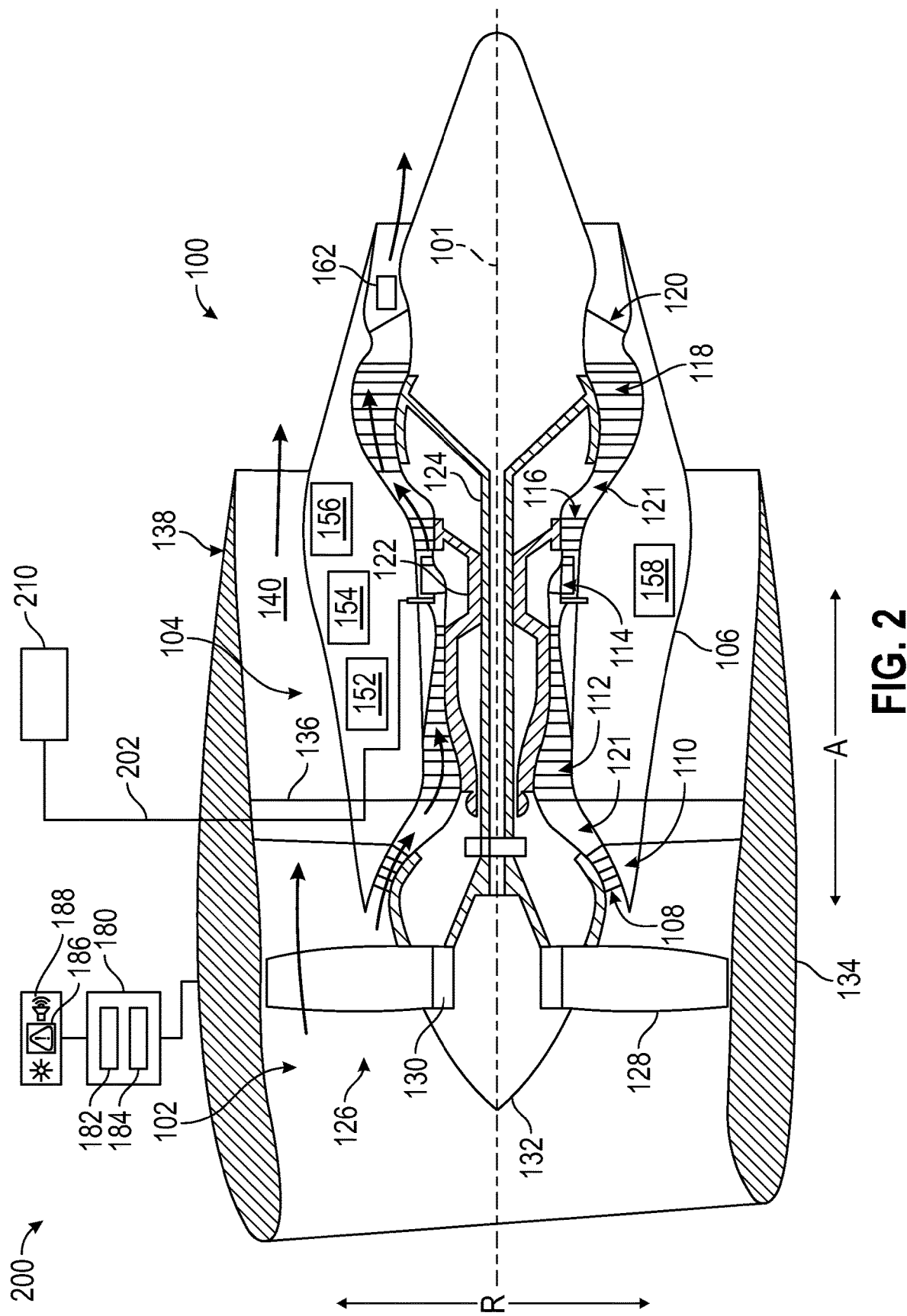
FIG. 2 is a schematic, cross-sectional view, taken along line 2-2 in FIG. 1, of a gas turbine engine that is used as a power generator for the aircraft shown in FIG. 1.

The turbomachine 104 depicted in FIG. 2 includes a tubular outer casing 106 that defines an annular inlet 108. The outer casing 106 encases, in a serial flow relationship, a compressor section including a booster or low-pressure (LP) compressor 110 and a high-pressure (HP) compressor 112, a combustion section 114, a turbine section including a high-pressure (HP) turbine 116 and a low-pressure (LP) turbine 118, and a jet exhaust nozzle section 120. The compressor section, the combustion section 114, and the turbine section together define at least in part a core air flowpath 121 extending from the annular inlet 108 to the jet exhaust nozzle section 120. The turbofan engine further includes one or more drive shafts. More specifically, the turbofan engine includes a high-pressure (HP) shaft or a spool 122 drivingly connecting the HP turbine 116 to the HP compressor 112, and a low-pressure (LP) shaft or a spool 124 drivingly connecting the LP turbine 118 to the LP compressor 110.

The fan section 102 shown in FIG. 2 includes a fan 126 having a plurality of fan blades 128 coupled to a disk 130 in a spaced-apart manner. The fan blades 128 and disk 130 are rotatable, together, about the longitudinal centerline (axis) 101 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104, so as to define a bypass airflow passage 140 therebetween.

The turbofan engine 100 is operable with the fuel system 200 and receives a flow of fuel from the fuel system 200. As will be described further below, the fuel system 200 includes a fuel delivery assembly 202 providing the fuel flow from the fuel tank 210 to the engine 100, and, more specifically, to a fuel manifold 172 (not labeled in FIG. 2; see FIG. 3) of the combustion section 114 of the turbomachine 104 of the turbofan engine 100.

The turbofan engine 100 also includes various accessory systems to aid in the operation of the turbofan engine 100 and/or an aircraft including the turbofan engine 100. For example, the turbofan engine 100 may include a main lubrication system 152, a compressor cooling air (CCA) system 154, an active thermal clearance control (ATCC) system 156, and a generator lubrication system 158, each of which is depicted schematically in FIG. 2. The main lubrication system 152 is configured to provide a lubricant to, for example, various bearings and gear meshes in the compressor section, the turbine section, the HP spool 122, and the LP shaft 124. The lubricant provided by the main lubrication system 152 may increase the useful life of such components and may remove a certain amount of heat from such components. The compressor cooling air (CCA) system 154 provides air from one or both of the HP compressor 112 or LP compressor 110 to one or both of the HP turbine 116 or LP turbine 118. The active thermal clearance control (ATCC) system 156 cools a casing of the turbine section to maintain a clearance between the various turbine rotor blades and the turbine casing within a desired range throughout various engine operating conditions. The generator lubrication system 158 provides lubrication to an electronic generator (not shown), as well as cooling/heat removal for the electronic generator. The electronic generator may provide electrical power to, for example, a startup electrical motor for the turbofan engine 100, and/or various other electronic components of the turbofan engine 100, and/or an aircraft including the turbofan engine 100.

Heat from these accessory systems 152, 154, 156, 158, and other accessory systems, may be provided to various heat sinks as waste heat from the turbofan engine 100 during operation, such as to various vaporizers 220, as discussed below. Additionally, the turbofan engine 100 may include one or more heat exchangers 162 within, for example, the turbine section or 120 for extracting waste heat from an airflow therethrough to also provide heat to various heat sinks, such as the vaporizers 220, discussed below.

It will be appreciated, however, that the turbofan engine 100 discussed herein is provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, and the like. In such a manner, it will further be appreciated that, in other embodiments, the gas turbine engine may have other suitable configurations, such as other suitable numbers or arrangements of shafts, compressors, turbines, fans, etc. Further, although the turbofan engine 100 is shown as a direct drive, fixed-pitch turbofan engine 100, in other embodiments, a gas turbine engine may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, still, in alternative embodiments, aspects of the present disclosure may be incorporated into, or otherwise utilized with, any other type of engine, such as reciprocating engines, as discussed above. Additionally, in still other exemplary embodiments, the exemplary turbofan engine 100 may include or be operably connected to any other suitable accessory systems. Additionally, or alternatively, the exemplary turbofan engine 100 may not include or be operably connected to one or more of the accessory systems 152, 154, 156, 158, and 162, as discussed above.

Figure 3:
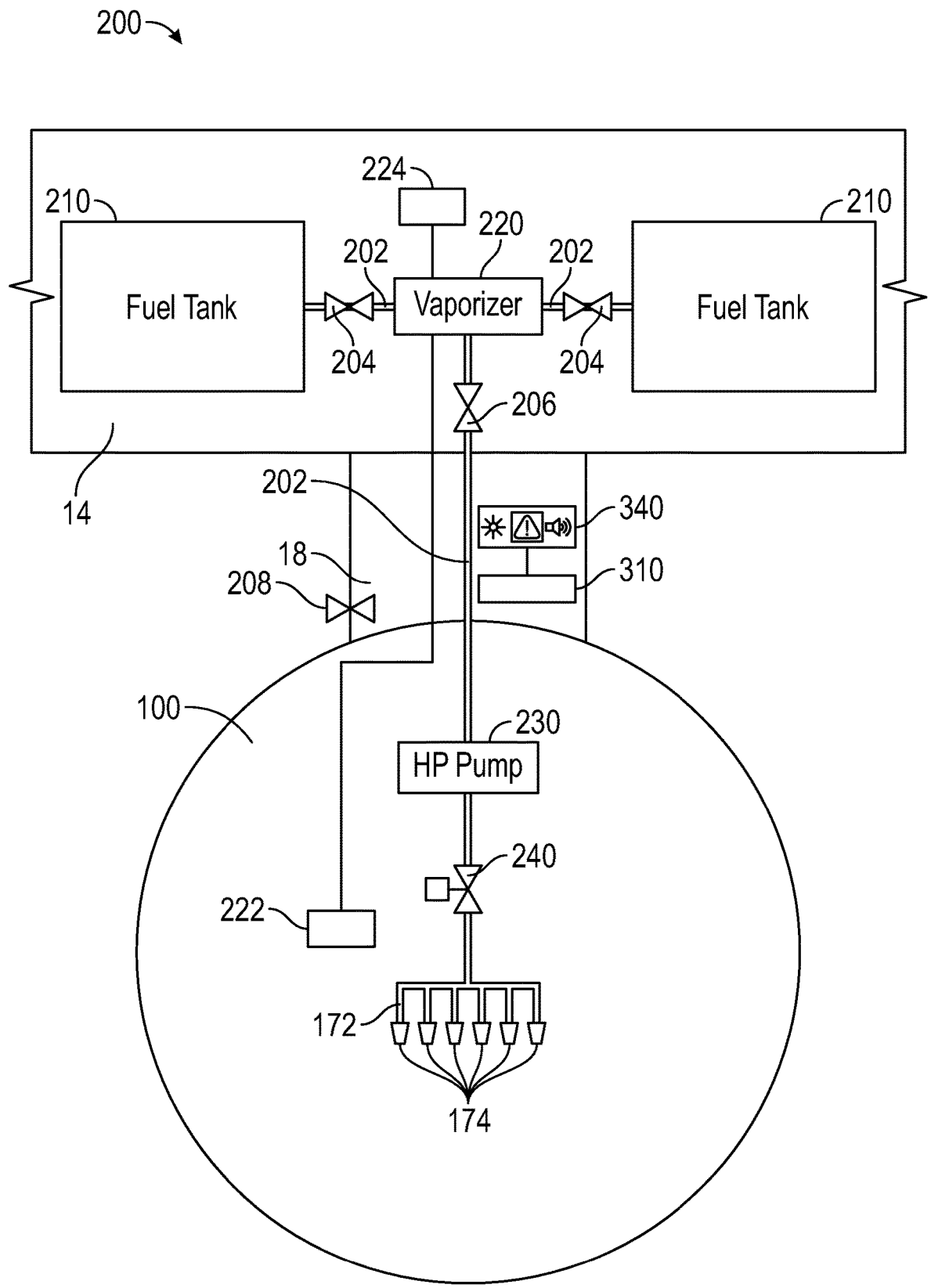
FIG. 3 is a schematic view of the fuel system according to an embodiment of the present disclosure.

FIG. 3 is a schematic view of the fuel system 200 according to an embodiment of the present disclosure that is configured to store the hydrogen fuel for the engine 100 in the fuel tank 210 and to deliver the hydrogen fuel to the engine 100 via a fuel delivery assembly 202. The fuel delivery assembly 202 includes tubes, pipes, and the like, to fluidly connect the various components of the fuel system 200 to the engine 100. The fuel system 200 of this embodiment includes two fuel tanks 210 configured to provide hydrogen fuel to the engine 100. An isolation valve 204 is provided in a flow path of the hydrogen fuel from each of the fuel tanks 210. The isolation valve 204 can be closed to isolate the respective fuel tank 210 and opened to allow hydrogen fuel to flow from the fuel tank 210.

The fuel tank 210 may be configured to hold the hydrogen fuel at least partially within the liquid phase, and may be configured to provide hydrogen fuel to the fuel delivery assembly 202 substantially completely in the liquid phase, such as completely in the liquid phase. For example, the fuel tank 210 may have a fixed volume and contain a volume of the hydrogen fuel in the liquid phase (liquid hydrogen fuel). As the fuel tank 210 provides hydrogen fuel to the fuel delivery assembly 202 substantially completely in the liquid phase, the volume of the liquid hydrogen fuel in the fuel tank 210 decreases and the remaining volume in the fuel tank 210 is made up by, for example, hydrogen in the gaseous phase (gaseous hydrogen). It will be appreciated that, as used herein, the term "substantially completely" as used to describe a phase of the hydrogen fuel refers to at least 99% by mass of the described portion of the hydrogen fuel being in the stated phase, such as at least 97.5%, such as at least 95%, such as at least 92.5%, such as at least 90%, such as at least 85%, or such as at least 75% by mass of the described portion of the hydrogen fuel being in the stated phase.

To store the hydrogen fuel substantially completely in the liquid phase, the hydrogen fuel is stored in the fuel tank 210 at very low (cryogenic) temperatures. For example, the hydrogen fuel may be stored in the fuel tank 210 at about −253 Deg. Celsius or less at atmospheric pressure, or at other temperatures and pressures to maintain the hydrogen fuel substantially in the liquid phase. The fuel tank 210 may be made from known materials such as titanium, Inconel®, aluminum, or composite materials. The fuel tank 210 and the fuel system 200 may include a variety of supporting structures and components to facilitate storing the hydrogen fuel in such a manner.

The liquid hydrogen fuel is supplied from the fuel tank 210 to the fuel delivery assembly 202. The fuel delivery assembly 202 may include one or more lines, conduits, etc., configured to carry the hydrogen fuel between the fuel tank 210 and the engine 100. The fuel delivery assembly 202 thus provides a flow path of the hydrogen fuel from the fuel tank 210 to the engine 100. Herein, the terms "downstream" and "upstream" may be used to describe the position of components relative to the direction of flow of the hydrogen fuel in the flow path of the fuel delivery assembly 202. The fuel delivery assembly 202 may also include various valves (for example, valve 206) and other components to deliver the hydrogen fuel to the engine 100 (that are not shown in FIG. 3).

The hydrogen fuel is delivered to the engine by the fuel delivery assembly 202 in the gaseous phase, the supercritical phase, or both (at least one of the gaseous phase and the supercritical phase). The fuel system 200 thus includes a vaporizer 220 in fluid communication with the fuel delivery assembly 202 to heat the liquid hydrogen fuel flowing through the fuel delivery assembly 202. The vaporizer 220 is positioned in the flow path of the hydrogen fuel between the fuel tank 210 and the engine 100. In the embodiment shown in FIG. 3, the vaporizer 220 is positioned at least partially within the fuselage 12 or the wing 14, such as at least partially within the wing 14. The vaporizer 220 may, however, be positioned at other suitable locations in the flow path of the hydrogen between fuel tank 210 and the engine 100. For example, the vaporizer 220 may be positioned external to the fuselage 12 and the wing 14 and positioned at least partially within the pylon 18 or the engine 100. Although only one vaporizer 220 is shown in FIG. 3, the fuel system 200 may include multiple vaporizers 220. For example, when a vaporizer 220 is positioned in the engine 100 or in the pylon 18 and functions as a primary vaporizer configured to operate once the engine 100 is in a thermally stable condition, another vaporizer 220 is positioned upstream of the primary vaporizer and proximate to the fuel tank 210 and functions as a primer vaporizer during start-up (or prior to start-up) of the engine 100.

The vaporizer 220 is in thermal communication with at least one heat source 222, 224. In this embodiment, the vaporizer 220 is in thermal communication with a primary heat source 222 and an auxiliary heat source 224. In this embodiment, primary heat source 222 is waste heat from the engine 100, and the vaporizer 220 is thus thermally connected to at least one of the main lubrication system 152, the compressor cooling air CCA system 154, the active thermal clearance control (ATCC) system 156, the generator lubrication system 158, and the heat exchangers 162 to extract waste heat from the engine 100 to heat the hydrogen fuel. In such a manner, it will be appreciated that the vaporizer 220 is configured to operate by drawing heat from the primary heat source 222 once the engine 100 is capable of providing enough heat, via the heat source 224, to the vaporizer 220, in order to facilitate operation of the vaporizer 220.

The vaporizer 220 may be heated by any suitable heat source, and, in this embodiment, for example, the auxiliary heat source 224 is a heat source external to the engine 100. The auxiliary heat source 224 may include, for example, an electrical power source, a catalytic heater or burner, and/or a bleed airflow from an auxiliary power unit. The auxiliary heat source 224 may be integral to the vaporizer 220, such as when the vaporizer 220 includes one or more electrical resistance heaters, or the like, that are powered by the electrical power source. In this configuration the auxiliary heat source 224 may provide heat for the vaporizer 220 independent of whether or not the engine 100 is running and can be used, for example, during start-up (or prior to start-up) of the engine 100.

As noted, the vaporizer 220 is in communication with the flow of the hydrogen fuel through the fuel delivery assembly 202. The vaporizer 220 is configured to draw heat from at least one of the primary heat source 222 and the auxiliary heat source 224 to heat the flow of hydrogen fuel from a substantially completely liquid phase to a substantially completely gaseous phase or to a substantially completely supercritical phase.

The fuel delivery assembly 202 also includes a high-pressure pump 230 to induce the flow of the hydrogen fuel through the fuel delivery assembly 202 to the engine 100.

The high-pressure pump 230 may generally be the primary source of pressure rise in the fuel delivery assembly 202 between the fuel tank 210 and the engine 100. The high-pressure pump 230 may be configured to increase a pressure in the fuel delivery assembly 202 to a pressure greater than a pressure within a combustion chamber of the combustion section 114 of the engine 100. For example, the high-pressure pump 230 may be configured to increase a pressure in the fuel delivery assembly 202 to at least four hundred pounds per square inch ("psi"), such as to at least five hundred psi, such as to at least six hundred psi, such as to at least seven hundred psi, such as to at least five hundred fifty psi, and/or such as up to two thousand psi.

The high-pressure pump 230 is positioned within the flow of hydrogen fuel in the fuel delivery assembly 202 at a location downstream of the vaporizer 220. In this embodiment, the high-pressure pump 230 is positioned external to the fuselage 12 and the wing 14, and is positioned at least partially within the pylon 18, or at least partially within the engine 100. More specifically, the high-pressure pump 230 is positioned within the engine 100. With the high-pressure pump 230 located in such a position, the high-pressure pump 230 may be any suitable pump configured to receive the flow of hydrogen fuel in substantially completely a gaseous phase or a supercritical phase. It will be appreciated, however, that, in other embodiments, the high-pressure pump 230 may be positioned at any other suitable locations, including other positions within the flow path of the hydrogen fuel. For example, the high-pressure pump 230 may be located upstream of the vaporizer 220 and may be configured to receive the flow of hydrogen fuel through the fuel delivery assembly 202 in a substantially completely liquid phase.

The fuel system 200 also includes a fuel metering unit in fluid communication with the fuel delivery assembly 202. In this embodiment, the fuel metering unit is a metering valve 240 positioned downstream of the vaporizer 220 and the high-pressure pump 230. The fuel system 200 is configured to provide the metering valve 240, and the metering valve 240 is configured to receive hydrogen fuel in a substantially completely gaseous phase, or in a substantially completely supercritical phase. The metering valve 240 is further configured to provide the flow of fuel to the engine 100 in a desired manner. More specifically, as depicted schematically in FIG. 3, the metering valve 240 is configured to provide a desired volume of hydrogen fuel, at, for example, a desired flow rate, to a fuel manifold 172 of the engine 100. The fuel manifold 172 then distributes (provides) the hydrogen fuel received to a plurality of fuel nozzles 174 within the combustion section 114 of the engine 100 where the hydrogen fuel is mixed with compressed air and the mixture of hydrogen fuel, and compressed air is combusted to generate combustion gases that drive the engine 100. Adjusting the metering valve 240 changes the volume of fuel provided to the combustion section 114 of the engine 100 and, thus, changes the amount of propulsive thrust produced by the engine 100 to propel the aircraft 10.

The hydrogen fuel used in the engine 100 and in the fuel system 200 may be substantially pure hydrogen molecules (diatomic hydrogen). As diatomic hydrogen is the smallest molecule known to exist, hydrogen can be difficult to contain, particularly, in the gaseous form. Hydrogen, when in a gaseous form, also tends to seep through materials and attachment points between components without leaving residue. The hydrogen is prone to leak through conventional seals and other small orifices such as cracks that may form in the fuel system 200 over time. Hydrogen, however, burns with a nearly colorless flame that is invisible in sunlight and is an odorless, colorless gas. As a result, leaks may be difficult to detect without additional systems to facilitate detection.

Figure 4:
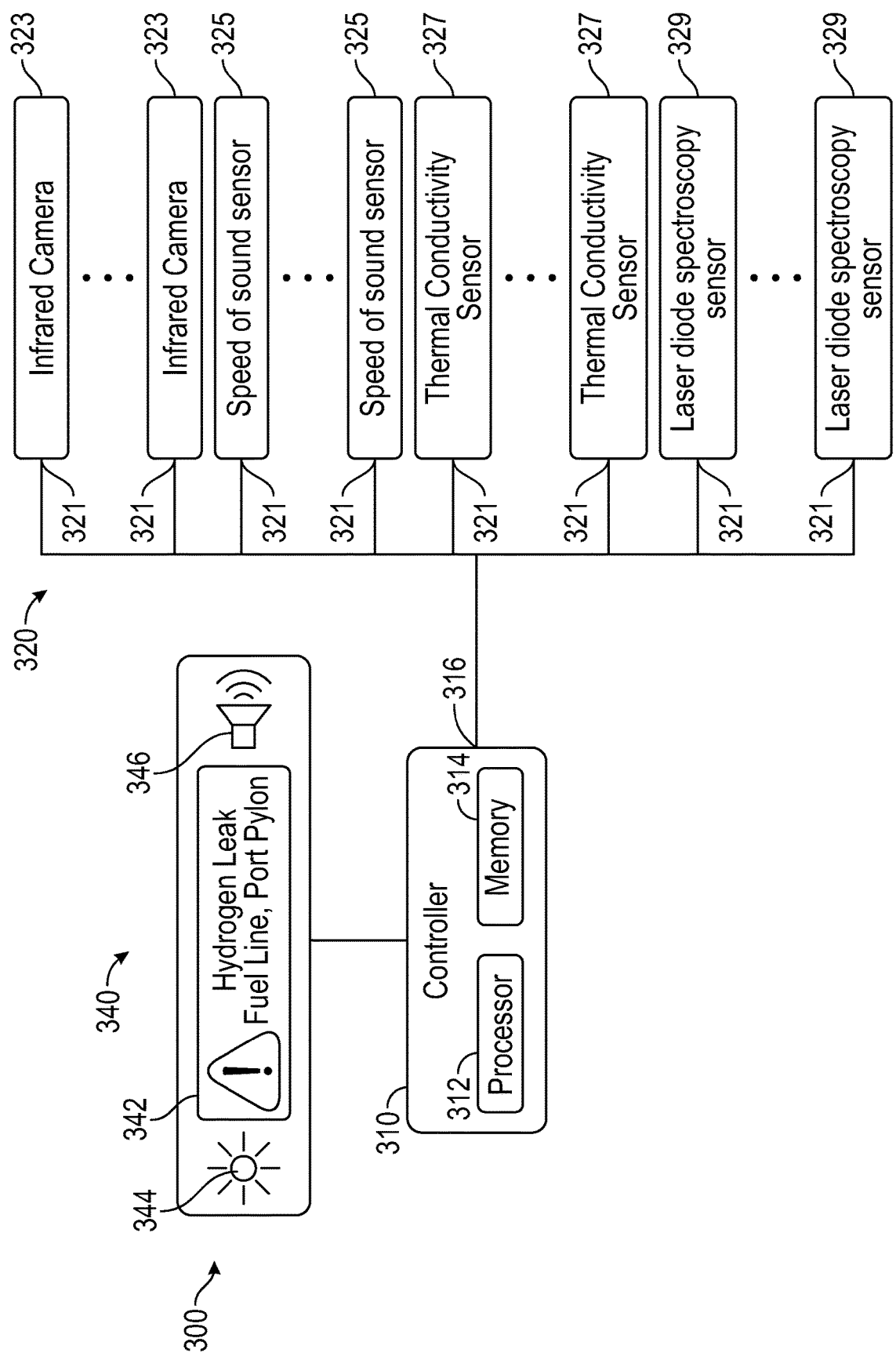
FIG. 4 is a schematic of a hydrogen leak detection system according to an embodiment of the present disclosure.

The fuel system 200 thus includes a hydrogen leak detection system 300. FIG. 4 is a schematic of the hydrogen leak detection system 300 according to an embodiment of the present disclosure. The hydrogen leak detection system 300 includes a leak detection controller 310 communicatively coupled to a plurality of sensors 320. Each sensor of the plurality of sensors 320 is configured to monitor a component of the aircraft 10 for an indication of a hydrogen leak. The monitored component may be any component in fluid communication with the hydrogen fuel, including, for example, the components of the fuel system 200, the fuel manifold 172, the fuel nozzles 174, and the combustor of the combustion section 114. Other monitored components in fluid communication with the hydrogen fuel and not explicitly identified above may include fuel filters and fuel purge or primer systems. The monitored component may also be a component housing one of the components in fluid communication with the hydrogen fuel. For example, the monitored component may be a portion of the fuselage 12, the wing 14, the pylon 18, and the engine 100. Various examples of the sensors and monitored components will be discussed in more detail below.

In this embodiment, the leak detection controller 310 is a computing device having one or more processors 312 and one or more memories 314. The processor 312 can be any suitable processing device, including, but not limited to, a microprocessor, a microcontroller, an integrated circuit, a logic device, a programmable logic controller (PLC), an application specific integrated circuit (ASIC), and/or a Field Programmable Gate Array (FPGA). The memory 314 can include one or more computer-readable media, including, but not limited to, non-transitory computer-readable media, a computer readable non-volatile medium (e.g., a flash memory), a RAM, a ROM, hard drives, flash drives, and/or other memory devices.

The memory 314 can store information accessible by the processor 312, including computer-readable instructions that can be executed by the processor 312. The instructions can be any set of instructions or a sequence of instructions that, when executed by the processor 312, cause the processor 312 and the leak detection controller 310 to perform operations. In some embodiments, the instructions can be executed by the processor 312 to cause the processor 312 to complete any of the operations and functions for which the leak detection controller 310 is configured, as will be described further below. The instructions can be software written in any suitable programming language or can be implemented in hardware. Additionally, and/or alternatively, the instructions can be executed in logically and/or virtually separate threads on the processor 312. The memory 314 can further store data that can be accessed by the processor 312.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

As noted above, the leak detection controller 310 is communicatively coupled to each sensor of the plurality of sensors 320. More specifically, the leak detection controller 310 includes a sensor interface 316, and each sensor of the plurality of sensors 320 includes a communication interface 321. The sensor interface 316 is communicatively coupled to the communication interface 321. Any suitable connection and protocol may be used including wired communications and wireless communications. Suitable connections include, for example, an electrical conductor, a low-level serial data connection, such as Recommended Standard (RS) 232 or RS-485, a high-level serial data connection, such as Universal Serial Bus (USB) or the Institute of Electrical and Electronics Engineers (IEEE®) 1394, a parallel data connection, such as IEEE® 1284 or IEEE® 488, and/or a short-range wireless communication channel, such as BLUETOOTH®. When a wired connection and protocol is used, the sensor interface 316 and the communication interface 321 each may include a suitable port, and, when a wireless protocol is used the sensor interface 316 and the communication interface 321, each may include a transmitter and a receiver.

As noted above, various suitable sensors may be used to monitor the aircraft 10, including the engine 100 and the fuel system 200, for hydrogen leaks. One suitable sensor is an infrared camera 323. A plurality of infrared cameras 323 may be used to monitor various different components of the aircraft 10. For example, the infrared camera 323 may be placed on the wing 14 to monitor the outer casing 106 and/or the nacelle 134 of the engine 100 (see FIG. 1). The infrared camera 323 may be mounted at other suitable locations, including, for example, on the fuselage 12, the pylon 18, or even the engine 100 itself. The infrared camera 323 is positioned to detect the infrared energy emitted by the monitored component, which, in this example, is the outer casing 106 and/or the nacelle 134. The infrared camera 323 generates an output based on the infrared energy and transmits the output to the leak detection controller 310 via the communication interface 321. The leak detection controller 310 then receives, via the sensor interface 316, the output from the infrared camera 323. The infrared camera 323 may output the temperature of the monitored component (or a portion thereof) or another output that can be used by the leak detection controller 310 to determine the temperature of the monitored component. The temperature of the monitored component is an indicator of a hydrogen fuel leak.

The leak detection controller 310 determines if there is a hydrogen fuel leak based on the output of the infrared camera 323. As the liquid hydrogen fuel is stored at cryogenic temperatures (e.g., −253 Deg. Celsius or less), an extreme cold temperature detected by the infrared camera 323 may indicate a hydrogen fuel leak. The leak detection controller 310 receives the output of the infrared camera 323, determines the temperature of the monitored component (if necessary), and compares the temperature to a threshold. When the temperature is lower than the threshold, the leak detection controller 310 determines that a leak has occurred in the monitored component. The threshold is a temperature lower than the temperature that the monitored component is expected to achieve during normal operation. Exterior components of the aircraft 10 may, for example, reach −73 Deg. Celsius (−100 Deg. Fahrenheit) during flight, and the threshold may be set at −100 Deg. Celsius (−150 Deg. Fahrenheit).

The infrared camera 323 may also be used to identify an extremely hot temperature that may indicate a hydrogen fuel leak that has resulted in combustion (a fire). The leak detection controller 310 receives the output of the infrared camera 323, determines the temperature of the monitored component (if necessary), and compares the temperature to a threshold. When the temperature is higher than the threshold, the leak detection controller 310 determines that a leak has occurred in the monitored component, or, more specifically in this example, a hydrogen fire has occurred. The threshold in this example is a temperature higher than the temperature that the monitored component is expected to achieve during normal operation. The nacelle 134 and the outer casing 106 may reach temperatures between 426 Deg. Celsius and 538 Deg. Celsius (800 Deg. Fahrenheit and 1,000 Deg. Fahrenheit) during normal operation, and the threshold may be set at 815 Deg. Celsius (1,500 Deg. Fahrenheit).

The leak detection controller 310 may use the temperature of the monitored component, based on the output of the infrared camera 323, in other suitable ways to determine if a leak has occurred. For example, the leak detection controller 310 may identify the temperature at a plurality of different times to calculate a rate of change in the temperature. A rapid decrease in the temperature may indicate a hydrogen fuel leak, and a rapid increase in the temperature may indicate a hydrogen fuel leak with combustion. The leak detection controller 310 then compares the calculated rate of change in the temperature of the monitored component to a lower threshold and/or an upper threshold. If the calculated rate of decrease in the temperature is lower than the lower threshold, the leak detection controller 310 determines that a leak has occurred in the monitored component. If the calculated rate of increase in the temperature is higher than the higher threshold, the leak detection controller 310 determines that a leak has occurred in the monitored component or, more specifically in this example, a hydrogen fire has occurred.

Another suitable sensor that may be used in the hydrogen leak detection system 300 is a speed of sound sensor 325. The speed of sound sensor 325 is configured to measure the speed of sound in the gas surrounding the speed of sound sensor 325. Hydrogen has a lower density than air, and, as such, the speed of sound will increase in hydrogen as compared to air. Accordingly, the speed of sound or a change in the speed of sound is an indicator of a hydrogen fuel leak.

The speed of sound sensor 325 in conjunction with the leak detection controller 310 may be configured to detect a change, and, more specifically, an increase in the speed of sound in the gas surrounding the speed of sound sensor 325. The speed of sound sensor 325 generates an output corresponding to the speed of sound surrounding the speed of sound sensor 325 and transmits the output to the leak detection controller 310 via the communication interface 321. The leak detection controller 310 then receives, via the sensor interface 316, the output from the speed of sound sensor 325. The speed of sound sensor 325 may output the speed of sound in the gas surrounding the speed of sound sensor 325 or another output that can be used by the leak detection controller 310 to determine the speed of sound. The leak detection controller 310 receives the output of the speed of sound sensor 325, determines the speed of sound (if necessary), and compares the speed of sound to a threshold. The threshold is a speed of sound higher than the speed of sound of the gas surrounding the speed of sound sensor 325 during normal operation. When the speed of sound is higher than the threshold, the leak detection controller 310 determines that a leak has occurred in a monitored component. Alternatively, the leak detection controller 310 may identify the speed of sound at a plurality of different times to calculate an increase in the speed of sound between the plurality of times. An increase in the speed of sound greater than a threshold or of a set percent increase may indicate a hydrogen fuel leak. If the calculated rate of increase in the speed of sound is higher than the threshold or greater than the set percent increase, the leak detection controller 310 determines that a leak has occurred in the monitored component.

Figure 5A:
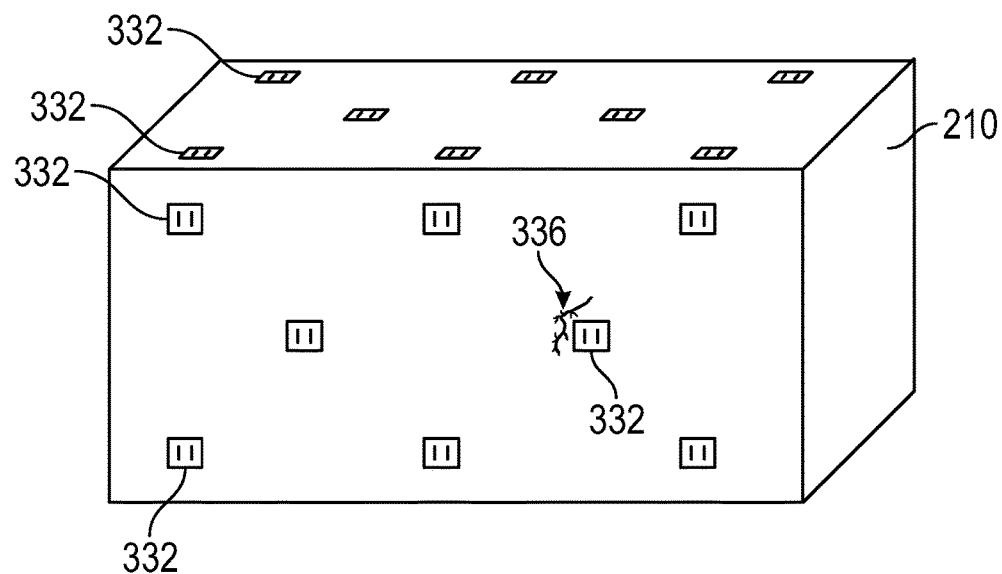
FIGS. 5A and 5B show components of the fuel system shown in FIG. 3 with sensors of the hydrogen leak detection system.
Figure 5B:
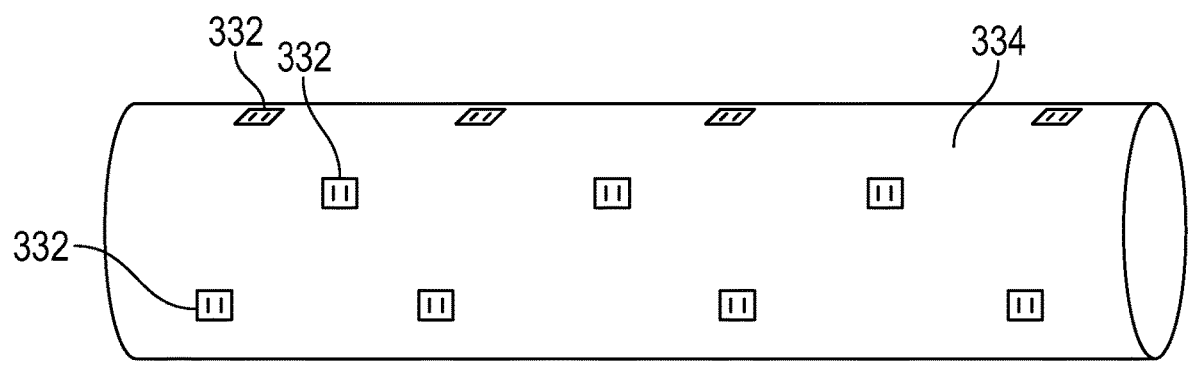

One suitable speed of sound sensor 325 is a surface acoustic wave (SAW) sensor 332. The SAW sensor 332 may be configured to detect the speed of sound in the gas surrounding the SAW sensor 332. The SAW sensor 332 may be placed on a monitored component to monitor the gas surrounding the monitored component for hydrogen leaks or in a compartment to monitor for hydrogen leaks. The SAW sensor 332 may be placed on any of the monitored components discussed above. For example, FIG. 5A shows a plurality of SAW sensors 332 positioned to monitor the fuel tank 210 as the monitored component, and FIG. 5B shows a plurality of SAW sensors 332 positioned on a pipe 334 of the fuel delivery assembly 202 as the monitored component. In FIGS. 5A and 5B, a plurality of the SAW sensors 332 is arrayed on an outer surface of the fuel tank 210 and the pipe 334, respectively. Only some of the SAW sensors 332 are labeled in FIGS. 5A and 5B. If a crack 336 occurs, for example, in the fuel tank 210 (as shown in FIG. 5A), the SAW sensor 332 in combination with the leak detection controller 310 will detect the change of the speed of sound surrounding the SAW sensor 332 and determine that a hydrogen leak as occurred in the fuel tank 210.

A further suitable sensor that may be used in the hydrogen leak detection system 300 is a thermal conductivity sensor 327, as shown in FIG. 4. The thermal conductivity sensor 327 is configured to measure the thermal conductivity of the gas surrounding the thermal conductivity sensor 327. Hydrogen has a higher thermal conductivity than the oxygen and nitrogen that make up 99% of air, and, as such, the thermal conductivity will increase in hydrogen as compared to air. Accordingly, the thermal conductivity or a change in the thermal conductivity is an indicator of a hydrogen fuel leak.

The thermal conductivity sensor 327 in conjunction with the leak detection controller 310 may be configured to detect a change, and, more specifically, an increase in the thermal conductivity in the gas surrounding the thermal conductivity sensor 327. The thermal conductivity sensor 327 generates an output corresponding to the thermal conductivity surrounding the thermal conductivity sensor 327 and transmits the output to the leak detection controller 310 via the communication interface 321. The leak detection controller 310 then receives, via the sensor interface 316, the output from the thermal conductivity sensor 327. The thermal conductivity sensor 327 may output the thermal conductivity in the gas surrounding the thermal conductivity sensor 327 or another output that can be used by the leak detection controller 310 to determine the thermal conductivity. The leak detection controller 310 receives the output of the thermal conductivity sensor 327, determines the thermal conductivity (if necessary), and compares the thermal conductivity to a threshold. The threshold is a thermal conductivity higher than the thermal conductivity of the gas surrounding the thermal conductivity sensor 327 during normal operation. When the thermal conductivity is higher than the threshold, the leak detection controller 310 determines that a leak has occurred in a monitored component. Alternatively, the leak detection controller 310 may identify the thermal conductivity at a plurality of different times to calculate an increase in the thermal conductivity between the plurality of times. An increase in the thermal conductivity greater than a threshold or of a set percent increase may indicate a hydrogen fuel leak. If the calculated rate of increase in the thermal conductivity is higher than the threshold or greater than the set percent increase, the leak detection controller 310 determines that a leak has occurred in the monitored component. The SAW sensor 332 can also be configured to detect the thermal conductivity of the gas surrounding the SAW sensor 332, and, thus, the SAW sensor 332 is an example of a suitable thermal conductivity sensor 327. When used as a thermal conductivity sensor 327, the SAW sensor 332 can be arranged as discussed above.

Yet another sensor that may be used in the hydrogen leak detection system 300 is a laser diode spectroscopy sensor 329. The laser diode spectroscopy sensor 329 emits a beam of laser light to excite a gas. Then, the laser diode spectroscopy sensor 329 detects the wavelengths of light emitted when the gas is excited. When hydrogen is present, the hydrogen will emit a light with a characteristic wavelength. The emitted light is detected by the laser diode spectroscopy sensor 329 and may be identified as corresponding to the characteristic wavelength of hydrogen, indicating that a leak has occurred. The laser diode spectroscopy sensor 329 generates an output corresponding to an indication that a wavelength of light corresponding to hydrogen has been detected and transmits the output to the leak detection controller 310 via the communication interface 321. The leak detection controller 310 then receives, via the sensor interface 316, the output from the laser diode spectroscopy sensor 329. When the output of the laser diode spectroscopy sensor 329 indicates the presence of hydrogen, the leak detection controller 310 determines that a leak has occurred. As with the other sensors of the plurality of sensors 320 discussed herein, the laser diode spectroscopy sensor 329 is located on a monitored component to monitor the component for the presence of hydrogen.

The examples of the plurality of sensors 320 discussed above are configured to detect attributes of parameters of the hydrogen in the hydrogen fuel. The sensors of the plurality of sensors 320 are not so limited and the sensors discussed above, or other suitable sensors, may be used to detect other attributes. In some embodiments, additives may be added to the hydrogen fuel and the sensors may be configured to detect those additives or parameters associated with those additives. Such additives may include, for example, safety markers added to the hydrogen fuel. One such safety marker is an odorant. Suitable odorants include, for example, mercaptans or sulfides. When an odorant is used, the sensor may be an appropriate sensor configured to detect the presence of the odorant. Another suitable visual safety marker is a noble gas, such as helium, neon, argon, krypton, xenon, and radon. The sensor may be configured to detect the presence of the noble gas. The SAW sensor 332 and the laser diode spectroscopy sensor 329 are examples of sensors that may be configured to detect the noble gas. For example, when the noble gas is present and excited by the beam of laser light emitted by the laser diode spectroscopy sensor 329, the laser diode spectroscopy sensor 329 detects the characteristic wavelengths of the noble gas, indicating that a leak has occurred.

The leak detection controller 310 is also communicatively coupled to at least one indicator 340. When the leak detection controller 310 determines that a leak has occurred, the leak detection controller 310 transmits an output to the indicator 340 to alert personnel that a hydrogen leak has occurred. Any suitable indicator 340 may be used to issue the alert. For example, the indicator 340 may be a display screen 342, and, upon receipt of the output from the leak detection controller 310, the display screen 342 displays the alert to indicate that a hydrogen leak has been detected. The alert may take any suitable form, including, for example, a warning symbol or a danger symbol and text. When text is included in the alert, the location of the hydrogen leak may also be included. For example, the leak detection controller 310 determines from which sensor of the plurality of sensors 320 the hydrogen leak is detected and uses that information to determine the location of the leak. The leak detection controller 310 then includes location information in the output to the display screen 342, and the display screen 342 uses the location information to display the location of the hydrogen fuel leak.

A light 344 is another suitable indicator 340. When the leak detection controller 310 determines that a leak has been detected, the leak detection controller 310 transmits an output to turn the light 344 on. Alternatively, the light 344 may be configured to flash, in order to provide the alert that a hydrogen leak has been detected.

A speaker 346 is another suitable indicator 340. The leak detection controller 310 may be configured to transmit an output that causes the speaker 346 to issue an audible alert. The audible alert may be an alarm indicating that a hydrogen leak has occurred, may be speech stating that a hydrogen leak has occurred, or both. When the audible alert includes speech, such speech may state the location of the hydrogen leak when location information is provided in the output from the leak detection controller 310.

The leak detection controller 310 and the indicator 340 may be dedicated to the hydrogen leak detection system 300. In such a case, each of the leak detection controller 310 and the indicator 340 may be located in the engine 100, such as in the nacelle 134, or in the pylon 18. But, each of the leak detection controller 310 and the indicator 340 may be positioned in other suitable locations including the fuselage 12 and the wing 14. The leak detection controller 310 may also be communicatively coupled to other controllers of the aircraft 10. Such controllers may include, for example, an engine controller 180 and a controller that is part of the flight control system for the aircraft 10 (flight controller 30). The output of the leak detection controller 310 may be received by the engine controller 180 and/or the flight controller 30. Alternatively, the leak detection controller 310 may be incorporated or configured as part of the engine controller 180 or the flight controller 30.

The engine controller 180 is schematically shown in FIG. 2, and may be a computing device, as in the leak detection controller 310 discussed above, having one or more processors 182 and one or more memories 184. The engine controller 180 is configured to operate various aspects of the engine 100 and the fuel system 200, including, for example, opening and closing valves, such as valves 204, 206, 208 or metering valve 240, operating the vaporizer 220, and operating the high-pressure pump 230. The engine controller 180 may be communicatively coupled to an indicator, such as a display device 186 and a speaker 188. The engine controller 180 may receive the output of the leak detection controller 310, and, when the output indicates that a hydrogen leak has been detected, generate an alert to be displayed or emitted on the indicator, such as the display device 186 and the speaker 188 in a manner similar to the alerts discussed above.

Additionally, when the engine controller 180 receives an output from the hydrogen leak detection system 300 that a leak has been detected, the engine controller 180 may be configured to take mitigating actions. For example, the fuel system 200 may include redundant components and the mitigating action may be switching to the redundant components. The aircraft 10 may include an entire fuel system 200 that is redundant or only certain components of the fuel system 200 may be redundant. As shown in FIG. 3, for example, the fuel system 200 discussed herein includes redundant fuel tanks 210. If a hydrogen leak is detected in one of the fuel tanks 210 by the leak detection controller 310, the engine controller 180 receives the output from the leak detection controller 310, including location information, and takes a mitigating action, which, in this case, is switching fuel tanks 210. More specifically, the mitigating action includes isolating the fuel tank 210 that has the hydrogen leak by closing one of the isolation valves 204, and opening the other isolation valve 204, if it is not already open, to provide hydrogen fuel from the other fuel tank 210. Another mitigating action may be isolating or shutting off all or part of the fuel system 200. For example, the engine controller 180 may operate valve 206 to isolate the components in the wing 14 from those in the pylon 18 and the engine 100, or the engine controller 180 may operate one of the isolation valves 204 to isolate one of the fuel tanks 210. A further mitigating action may be venting the area of the hydrogen fuel leak to atmosphere to minimize the buildup of hydrogen or to keep the hydrogen concentration below an acceptable limit (such as the minimum concentration of hydrogen necessary to sustain combustion). For example, if the hydrogen leak is detected in a component of the fuel system 200 located in the pylon 18, the engine controller 180 may open a vent valve 208 to vent the pylon 18 to the atmosphere. Yet another mitigating action may be shutting down (deactivating) systems or components. For example, the engine controller 180 may shut down the engine 100 when the leak detection controller 310 determines that a hydrogen fuel leak has occurred.

The flight controller 30 is schematically shown in FIG. 1 and may be a computing device, as in the leak detection controller 310 discussed above, having one or more processors 32 and one or more memories 34. The flight controller 30 is configured to operate various aspects of the aircraft 10 and may be communicatively coupled to the engine controller 180 and/or the leak detection controller 310. The flight controller 30 of this embodiment is located in the fuselage 12. The aircraft 10 includes a cockpit 20 where pilots fly the aircraft 10. The flight controller 30 is communicatively coupled to a plurality of controls (not shown) in the cockpit 20 for operating the aircraft 10. The flight controller 30 is also communicatively coupled to an indicator, such as a display device 36 and a speaker 38. The flight controller 30 may receive the output of the leak detection controller 310, and, when the output indicates that a hydrogen leak has been detected, generate an alert to be displayed or emitted on the indicator, such as the display device 36 and the speaker 38 in a manner similar to the alerts discussed above. In this embodiment, the display device 36 and the speaker 38 are in the cockpit 20 to alert the pilots of a hydrogen fuel leak, allowing the pilots to take appropriate mitigating actions.

In the embodiments discussed above, the fuel system 200 stores hydrogen fuel as a liquid in the fuel tank 210. However, the hydrogen leak detection system 300 discussed herein is not so limited and it may be used with fuel systems 200 where the hydrogen fuel is stored in a gaseous phase. In such a system, the vaporizer 220 may be omitted.

Although the aircraft 10 shown in FIG. 1 is an airplane, the embodiments described herein may also be applicable to other aircraft 10, including, for example, helicopters and unmanned aerial vehicles (UAV). The aircraft discussed herein are fixed-wing aircraft or rotor aircraft that generate lift by aerodynamic forces acting on, for example, a fixed wing (e.g., wing 14) or a rotary wing (e.g., rotor of a helicopter), and are heavier-than-air aircraft, as opposed to lighter-than-air aircraft (such as a dirigible). In addition, the embodiments described herein may also be applicable to other applications where hydrogen is used as a fuel. The engines described herein are gas turbine engines, but the embodiments described herein also may be applicable to other engines. Further, the engine, specifically, the gas turbine engine, is an example of a power generator using hydrogen as a fuel, but hydrogen may be used as a fuel for other power generators. For example, the power generator may be a fuel cell (hydrogen fuel cell) where the hydrogen is provided to the fuel cell to generate electricity by reacting with air. Such power generators may be used in various applications, including stationary power generation systems (including both gas turbines and hydrogen fuel cells) and other vehicles beyond the aircraft 10 explicitly described herein, such as boats, ships, cars, trucks, and the like.

Further aspects of the present disclosure are provided by the subject matter of the following clauses.

A hydrogen fuel system comprising: a fuel tank for holding a hydrogen fuel; a power generator configured to generate power; a fuel delivery assembly extending from the fuel tank to the power generator, the fuel delivery assembly being configured to provide the hydrogen fuel from the fuel tank to the power generator in at least one of a gaseous phase and a supercritical phase; a monitored component, the monitored component being a component of one of the fuel tank, the power generator, and the fuel delivery assembly; and a fuel leak detection system including: (a) a sensor positioned to monitor at least a portion of the monitored component, the sensor being configured (i) to sense a parameter corresponding to a hydrogen fuel leak of the monitored component, and (ii) to generate an output; and (b) a controller communicatively coupled to the sensor, the controller configured (i) to receive the output of the sensor, (ii) to determine, based on the output of the sensor, if a leak has occurred in the monitored component, and (iii) to generate an output indicating a fuel system leak when the controller determines that the leak has occurred in the monitored component.

The hydrogen fuel system of any preceding clause, wherein the power generator is an engine having an engine controller, the engine controller being configured to receive the output of the controller of the fuel leak detection system.

The hydrogen fuel system of any preceding clause, wherein the power generator is an engine having an engine controller, the engine controller being the controller of the fuel leak detection system.

The hydrogen fuel system of any preceding clause, wherein the power generator is an engine having an engine controller, the engine controller being configured to take a mitigating action when the controller of the fuel leak detection system determines that the leak has occurred in the monitored component.

The hydrogen fuel system of any preceding clause, further comprising a compartment, the compartment having the monitored component located therein, wherein the mitigating action is venting the compartment to atmosphere.

The hydrogen fuel system of any preceding clause, wherein the mitigating action is isolating the monitored component.

The hydrogen fuel system of any preceding clause, further comprising an isolation valve, and wherein isolating the monitored component includes closing the isolation valve.

The hydrogen fuel system of any preceding clause, further comprising a redundant component, the redundant component being a component of one of the fuel tank, the power generator, and the fuel delivery assembly, wherein the mitigating action is switching from the monitored component to the redundant component.

The hydrogen fuel system of any preceding clause, wherein the fuel tank is a first fuel tank, the first fuel tank being the monitored component, and wherein the hydrogen fuel system further comprises a second fuel tank, the second fuel tank being the redundant component.

The hydrogen fuel system of any preceding clause, wherein the mitigating action is shutting down the engine.

The hydrogen fuel system of any preceding clause, wherein the fuel leak detection system further includes an indicator, the indicator being configured receive the output from the controller of the fuel leak detection system and to provide an alert indicating a fuel system leak, when the controller determines the leak has occurred in the monitored component.

The hydrogen fuel system of any preceding clause, wherein the indicator is a display configured to display the alert.

1The hydrogen fuel system of any preceding clause, wherein the indicator is a speaker and the alert is an audible alert.

The hydrogen fuel system of any preceding clause, wherein the indicator is a light and when the alert is provided, the light is one of on and flashing.

The hydrogen fuel system of any preceding clause, wherein the sensor is an infrared camera configured to monitor the temperature of the monitored component.

The hydrogen fuel system of any preceding clause, wherein the controller is configured to determine, based on the output of the infrared camera, if the temperature is lower than a threshold and, when the temperature is lower than the threshold, the controller determines that a leak has occurred in the monitored component.

The hydrogen fuel system of any preceding clause, wherein the controller is configured to determine, based on the output of the infrared camera, if the temperature is higher than a threshold and, when the temperature is higher than the threshold, the controller determines that a leak has occurred in the monitored component.

The hydrogen fuel system of any preceding clause, wherein the controller is configured to determine, based on the output of the infrared camera, a temperature rise over a period of time, and, when the temperature rise over the period of time is higher than a threshold, the controller determines that a leak has occurred in the monitored component.

The hydrogen fuel system of any preceding clause, wherein the sensor is a speed of sound sensor configured to detect the speed of sound in a surrounding gas, and wherein the controller is configured to determine, based on the output of the speed of sound sensor, if the speed of sound is higher than a threshold and, when the speed of sound is higher than the threshold, the controller determines that a leak has occurred in the monitored component.

The hydrogen fuel system of any preceding clause, wherein the speed of sound sensor is a surface acoustical wave sensor.

The hydrogen fuel system of any preceding clause, wherein the sensor is a thermal conductivity sensor configured to detect a change in the thermal conductivity of a surrounding gas, and wherein the controller is configured to determine, based on the output of the thermal conductivity sensor, if the thermal conductivity is higher than a threshold and, when the thermal conductivity is higher than the threshold, the controller determines that a leak has occurred in the monitored component.

The hydrogen fuel system of any preceding clause, wherein the thermal conductivity sensor is a surface acoustical wave sensor.

The hydrogen fuel system of any preceding clause, wherein the sensor is a surface acoustical wave sensor.

The hydrogen fuel system of any preceding clause, wherein the sensor is a laser diode spectroscopy sensor configured to detect the presence of the wavelengths of light emitted when hydrogen gas is excited, and wherein, when the presence of the wavelengths of light emitted when hydrogen gas is excited are detected, the controller determines that a leak has occurred in the monitored component.

The hydrogen fuel system of any preceding clause, wherein the hydrogen fuel includes a safety marker and the sensor is configured to detect the presence of the safety marker.

The hydrogen fuel system of any preceding clause, wherein the safety marker is a noble gas, wherein the sensor is a laser diode spectroscopy sensor configured to detect the presence of the wavelengths of light emitted when the noble gas is excited, and wherein, when the presence of the wavelengths of light emitted when the noble gas is excited are detected, the controller determines that a leak has occurred in the monitored component.

The hydrogen fuel system of any preceding clause, wherein the monitored component includes an outer surface and the sensor is positioned on the outer surface of the monitored component.

The hydrogen fuel system of any preceding clause, wherein fuel leak detection system further includes a plurality of sensors arrayed on the outer surface of the monitored component.

The hydrogen fuel system of any preceding clause, wherein fuel leak detection system further includes a plurality of sensors.

The hydrogen fuel system of any preceding clause, wherein the power generator is a gas turbine engine.

An aircraft comprising: a fuselage; a wing connected to the fuselage; the hydrogen fuel system of any preceding clause, wherein the fuel tank is positioned at least partially within at least one of the fuselage and the wing and the power generator is configured to generate power for the aircraft.

The aircraft of any preceding clause, wherein the power generator is a gas turbine engine.

The aircraft of any preceding clause, further comprising a flight control system, the flight control system being configured to receive the output of the controller of the fuel leak detection system.

The aircraft of any preceding clause, further comprising a flight control system, the flight control system having a controller, the controller of the flight control system being the controller of the fuel leak detection system.

The aircraft of any preceding clause, further comprising a cockpit located in the fuselage, wherein the fuel leak detection system further includes an indicator located in the cockpit, the indicator being configured receive the output from the controller of the fuel leak detection system and to provide an alert indicating a fuel system leak, when the controller determines the leak has occurred in the monitored component.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

What we claim is:

1. A hydrogen fuel system comprising: a fuel tank for holding a hydrogen fuel;
   a power generator configured to generate power;
   a fuel delivery assembly extending from the fuel tank to the power generator, the fuel delivery assembly being configured to provide the hydrogen fuel from the fuel tank to the power generator in at least one of a gaseous phase and a supercritical phase;
   a monitored component having an outer surface, the monitored component being a component of one of the fuel tank, the power generator, and the fuel delivery assembly in fluid communication with the hydrogen fuel during non-leaking conditions; and
   a fuel leak detection system including:
   (a) a plurality of sensors attached to the outer surface of the monitored component in a two-dimensional array to monitor gas surrounding the monitored component, the plurality of sensors of the two-dimensional array being arranged to form a checkerboard pattern with gaps between the sensors of the two-dimensional array, the checkerboard pattern being such that the gaps between the sensors of the two-dimensional array alternate with the sensors in a first direction and in a second direction transverse to the first direction, each sensor of the plurality of sensors being configured
      (i) to sense a parameter corresponding to a hydrogen fuel leak of the monitored component, and
      (ii) to generate a sensor output; and
   (b) a controller communicatively coupled to the plurality of sensors, the controller configured
      (i) to receive the sensor output of each sensor of the plurality of sensors,
      (ii) to determine, based on the sensor output of each sensor the plurality of sensors, if the hydrogen fuel leak has occurred in the monitored component, and
      (iii) to generate a controller output indicating a fuel system leak when the controller determines that the hydrogen fuel leak has occurred in the monitored component.

2. The hydrogen fuel system of claim 1, wherein the power generator is an engine having an engine controller, the engine controller being configured to take a mitigating action when the controller of the fuel leak detection system determines that the hydrogen fuel leak has occurred in the monitored component.

3. The hydrogen fuel system of claim 2, further comprising a compartment, the compartment having the monitored component located therein, wherein the mitigating action is venting the compartment to atmosphere.

4. The hydrogen fuel system of claim 2, further comprising an isolation valve, wherein the mitigating action is isolating the monitored component by closing the isolation valve.

5. The hydrogen fuel system of claim 2, further comprising a redundant component, the redundant component being a component of one of the fuel tank, the power generator, and the fuel delivery assembly, wherein the mitigating action is switching from the monitored component to the redundant component.

6. The hydrogen fuel system of claim 2, wherein the mitigating action is shutting down the engine.

7. The hydrogen fuel system of claim 1, wherein the fuel leak detection system further includes an indicator, the indicator being configured receive the controller output from the controller of the fuel leak detection system and to provide an alert indicating a fuel system leak, when the controller determines the hydrogen fuel leak has occurred in the monitored component.

8. The hydrogen fuel system of claim 7, wherein the indicator is one of (i) a display configured to display the alert, (ii) a speaker configured to emit the alert as an audible alert, and (iii) a light where, when the alert is provided, the light is one of on and flashing.

9. The hydrogen fuel system of claim 1, wherein each sensor of the plurality of sensors is a speed of sound sensor configured to detect the speed of sound in a surrounding gas, and wherein the controller is configured to determine, based on the sensor output of the speed of sound sensor, if the speed of sound is higher than a threshold and, when the speed of sound is higher than the threshold, the controller determines that the hydrogen fuel leak has occurred in the monitored component.

10. The hydrogen fuel system of claim 1, wherein each sensor of the plurality of sensors is a thermal conductivity sensor configured to detect a change in a thermal conductivity of a surrounding gas, and wherein the controller is configured to determine, based on the sensor output of the thermal conductivity sensor, if the thermal conductivity is higher than a threshold and, when the thermal conductivity is higher than the threshold, the controller determines that the hydrogen fuel leak has occurred in the monitored component.

11. The hydrogen fuel system of claim 1, wherein each sensor of the plurality of sensors is a surface acoustical wave sensor.

12. The hydrogen fuel system of claim 1, wherein each sensor of the plurality of sensors is a laser diode spectroscopy sensor configured to detect a presence of wavelengths of light emitted when hydrogen gas is excited, and wherein, when the presence of the wavelengths of light emitted when hydrogen gas is excited are detected, the controller determines that the hydrogen fuel leak has occurred in the monitored component.

13. The hydrogen fuel system of claim 1, wherein the hydrogen fuel includes a safety marker and each sensor of the plurality of sensors is configured to detect a presence of the safety marker.

14. The hydrogen fuel system of claim 13, wherein the safety marker is a noble gas, wherein each sensor of the plurality of sensors is a laser diode spectroscopy sensor configured to detect the presence of the wavelengths of light emitted when the noble gas is excited, and wherein, when the presence of the wavelengths of light emitted when the noble gas is excited are detected, the controller determines that the hydrogen fuel leak has occurred in the monitored component.

15. The hydrogen fuel system of claim 1, wherein the power generator is a gas turbine engine.

16. An aircraft comprising:
a fuselage;
a wing connected to the fuselage; and
the hydrogen fuel system of claim 1, wherein the fuel tank is positioned at least partially within at least one of the fuselage and the wing and the power generator is configured to generate power for the aircraft.

17. The aircraft of claim 16, further comprising a cockpit located in the fuselage, wherein the fuel leak detection system further includes an indicator located in the cockpit, the indicator being configured receive the controller output from the controller of the fuel leak detection system and to provide an alert indicating a fuel system leak, when the controller determines the hydrogen fuel leak has occurred in the monitored component.

18. The hydrogen fuel system of claim 1, wherein the first direction is orthogonal to the second direction.

19. The hydrogen fuel system of claim 1, wherein the outer surface of the monitored component is arcuate having a circumferential direction, one of the first direction and the second direction being the circumferential direction.

* * * * *